June 4, 1957  L. F. REYNOLDS  2,794,383
AIR CONDITIONING AND VENTILATING MEANS FOR VEHICLES
Filed May 4, 1953  7 Sheets-Sheet 1
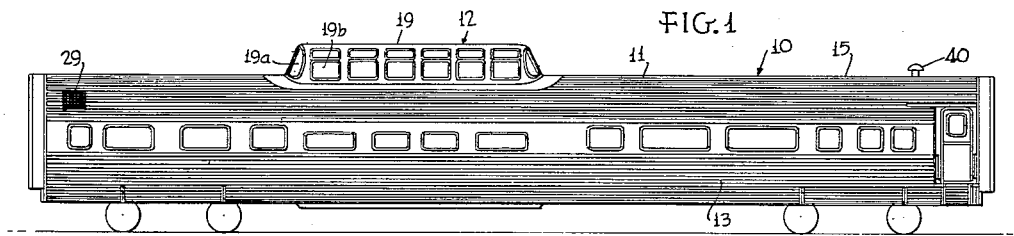
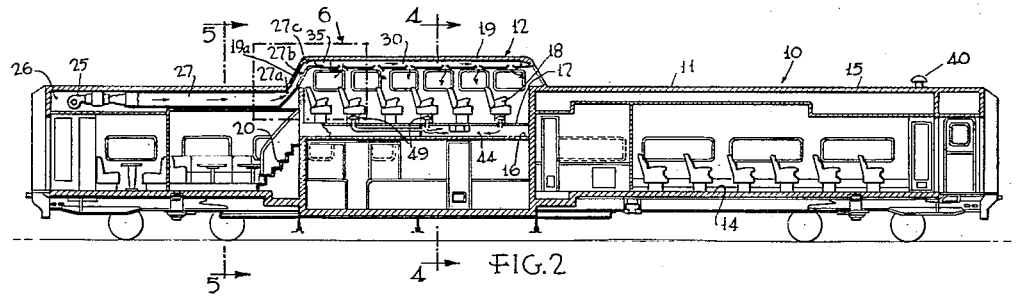
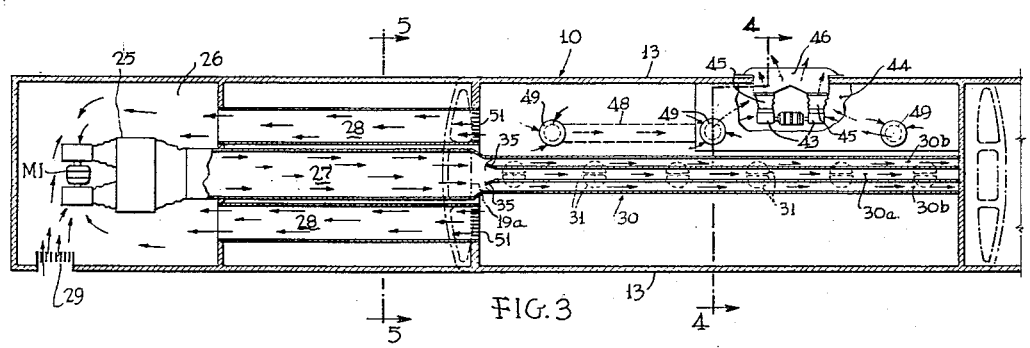
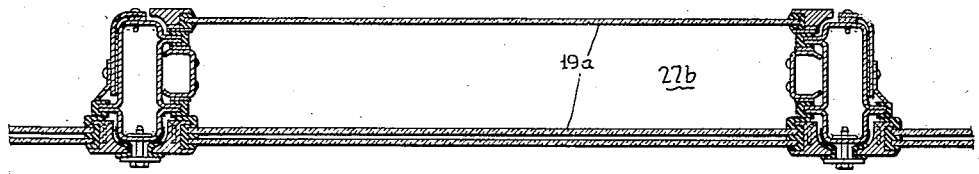
INVENTOR
Lewis F. Reynolds.
BY *Maurice A. Crews*
ATTORNEY

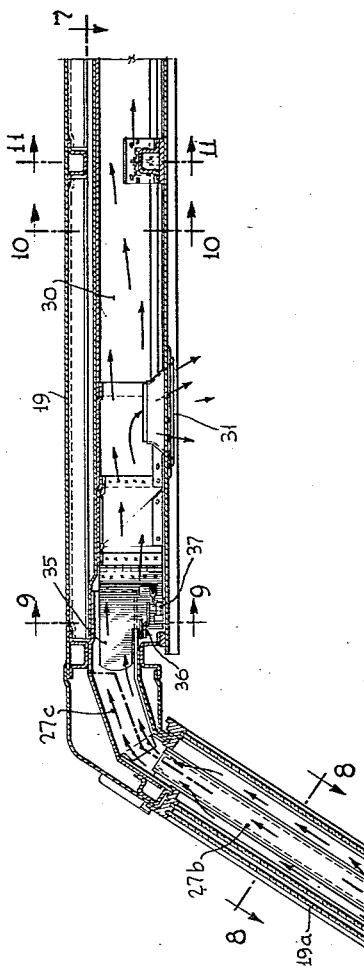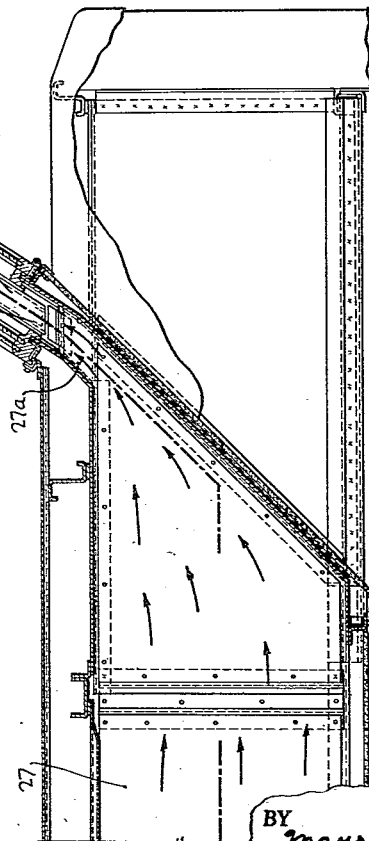

June 4, 1957 L. F. REYNOLDS 2,794,383
AIR CONDITIONING AND VENTILATING MEANS FOR VEHICLES
Filed May 4, 1953 7 Sheets-Sheet 5

INVENTOR
Lewis F. Reynolds.
BY
ATTORNEY

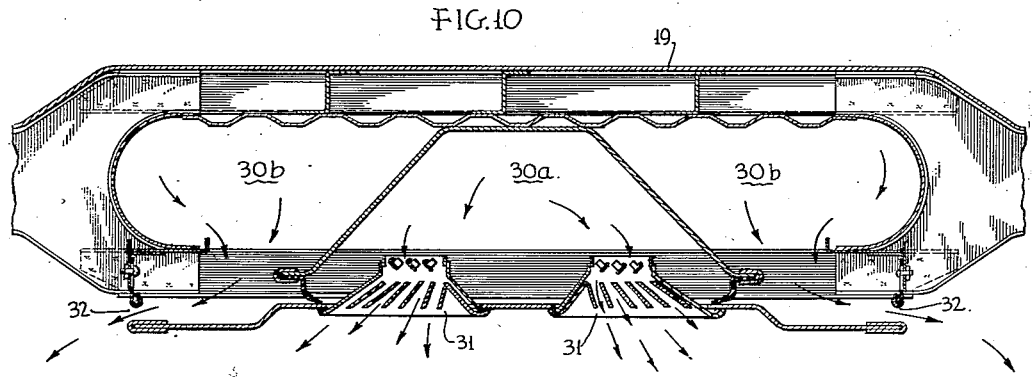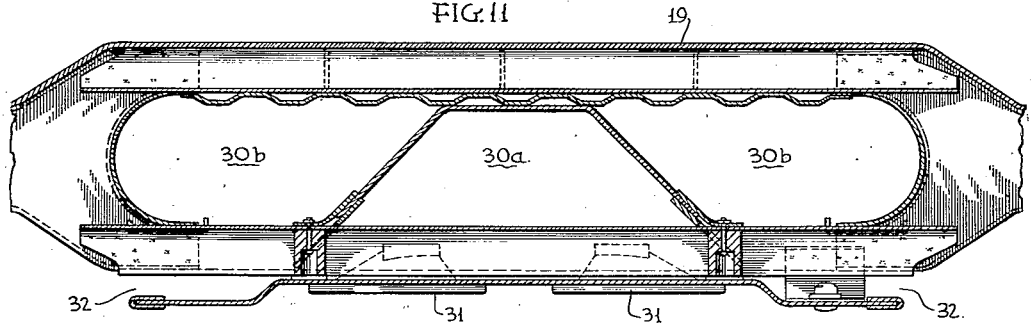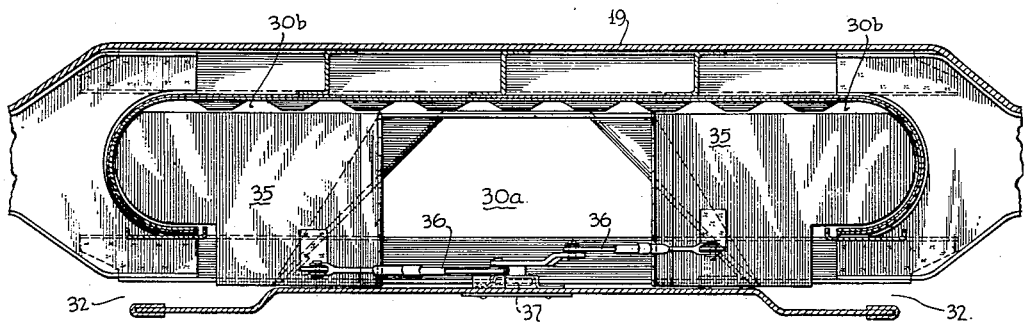

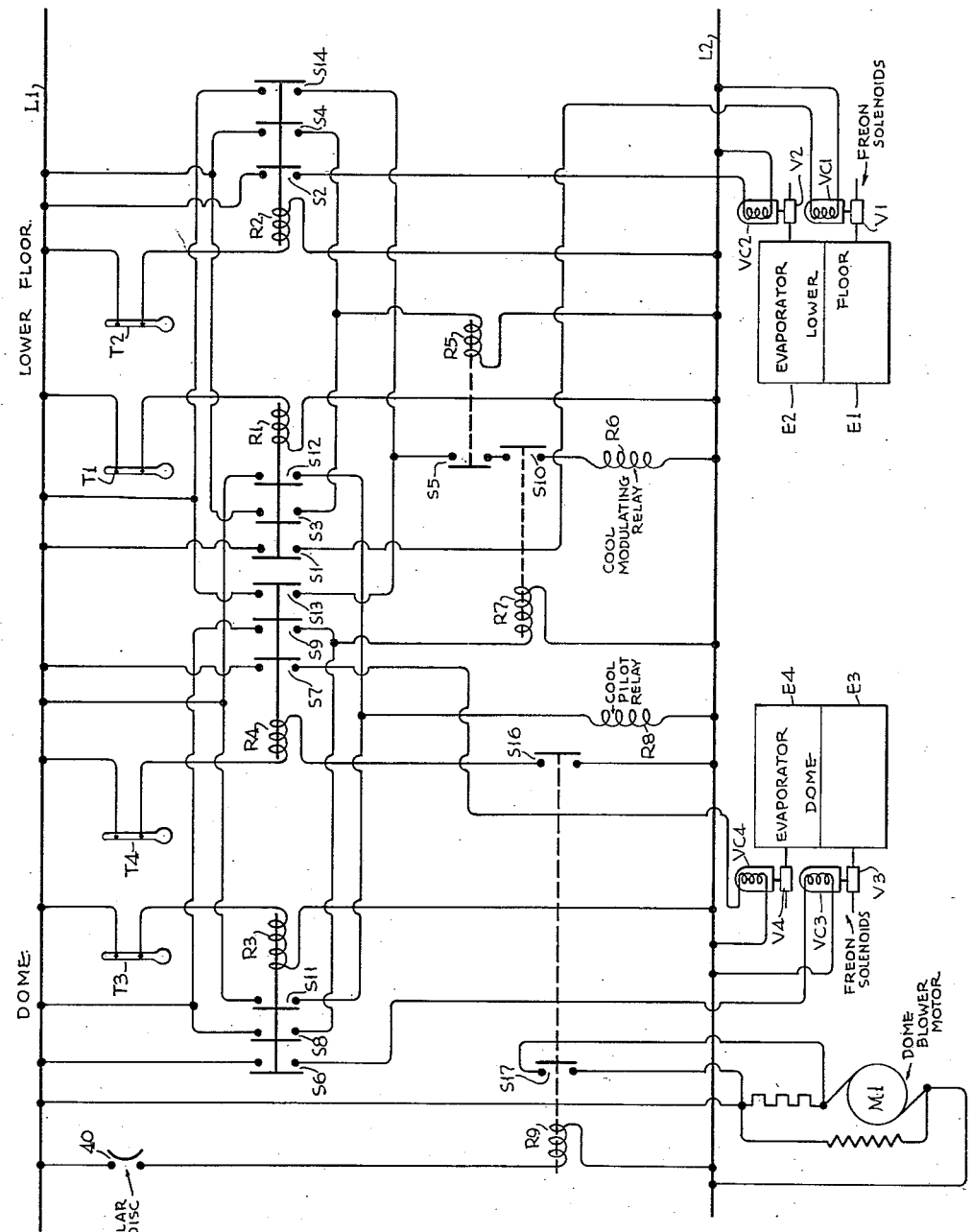

United States Patent Office 2,794,383
Patented June 4, 1957

2,794,383

AIR CONDITIONING AND VENTILATING MEANS FOR VEHICLES

Lewis F. Reynolds, Philadelphia, Pa., assignor to Budd Company, Philadelphia, Pa., a corporation of Pennsylvania Application May 4, 1953, Serial No. 352,793

5 Claims. (Cl. 98—10)

This invention relates to air conditioning and ventilating means for vehicles, especially for the dome section of clear-roof railway cars, and has for an object the provision of improvements in this art.

Glass-domed cars are subject to certain conditions which cause discomfort of a type and character different from that encountered in usual single level cars. When the sun is very bright the passengers seated in the dome section are uncomfortable in spite of the special heat-ray resistant glass and the ample capacity of the air conditioning equipment which are provided. Another annoyance is caused by the large amount of air supplied to the dome section in the cooling season, this annoyance being due to a draft of cold air down the stair well. Moreover, when the sun is not shining, the supply of air is excessive for the needs and uselessly expensive.

One of the objects of the present invention is to provide a flow of air along and across the under surface of the dome roof and past the passengers when cooled air is supplied in hot weather, this special cooling effect being dispensed with in the heating season when a directed draft would be objectionable.

Another object is to provide amounts of air in accordance with the outside temperatures, especially as affected by sunshine, more air being supplied when the sun shines and less when it is cloudy.

Another object is to withdraw part of the used air from the dome section and force it directly outdoors to avoid uncomfortable drafts down the stairs.

The above and other objects and advantages of the invention will be apparent from the following description of an exemplary embodiment, reference being made to the accompanying drawings thereof, wherein:

Fig. 1 is a side elevation of a dome car with which apparatus and method according to the present invention are used.

Fig. 2 is a longitudinal vertical sectional view, somewhat diagrammatic in nature, showing the principal elements of the equipment;

Fig. 3 is a diagrammatic plan view through the air ducts;

Fig. 6 is an enlarged partial longitudinal vertical section taken on the line 6—6 of Fig. 5 and in the zone 6 of Fig. 2;

Fig. 8 is an enlarged transverse section taken on the line 8—8 of Fig. 6;

Fig. 9 is an enlarged transverse section taken on the line 9—9 of Fig. 6;

Fig. 10 is an enlarged transverse section taken on the line 10—10 of Fig. 6;

Fig. 11 is an enlarged transverse section taken on the line 11—11 of Fig. 6; and Fig. 12 is a wiring diagram.

Figure 4:
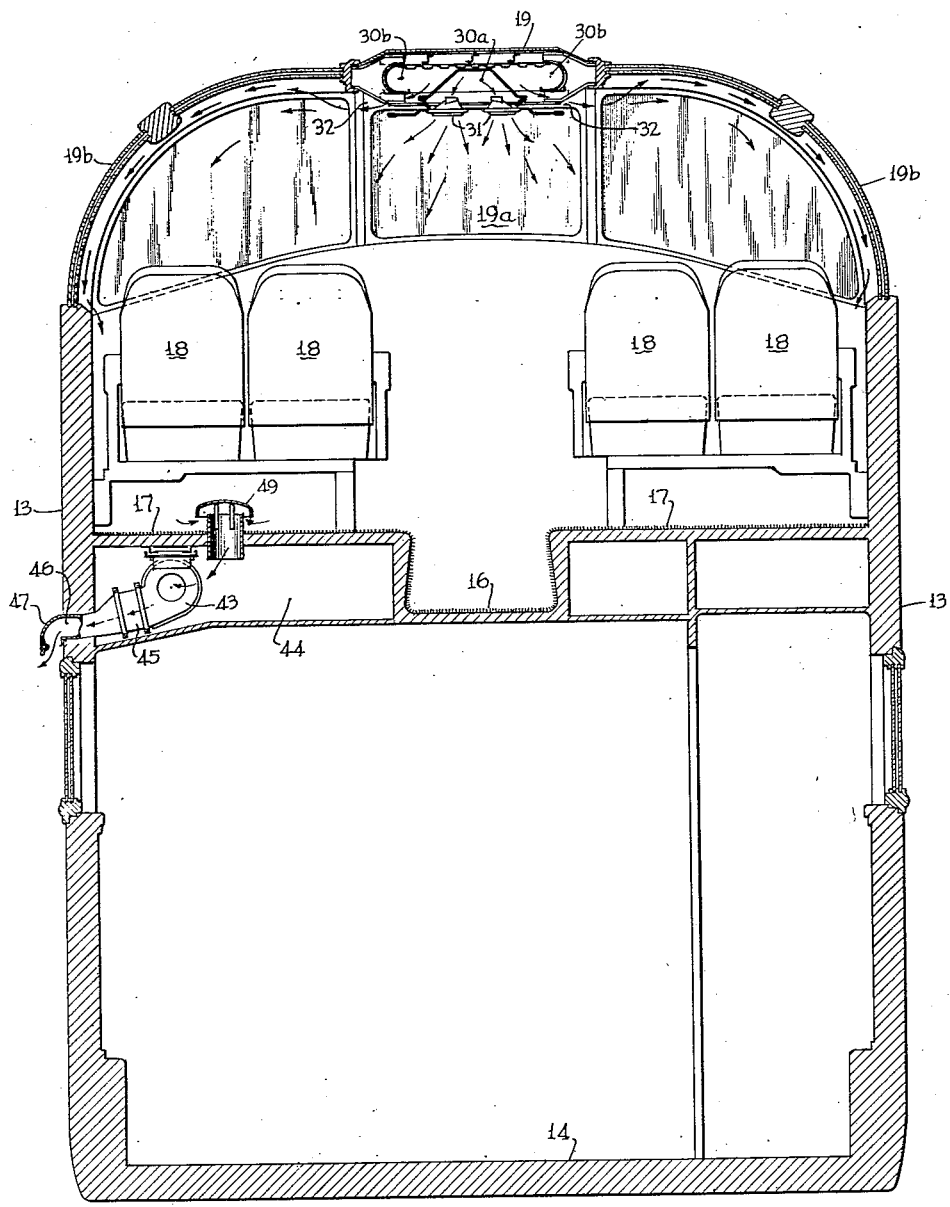
Fig. 4 is an enlarged transverse vertical section taken on the line 4—4 of Figs. 2 and 3.
Figure 5:
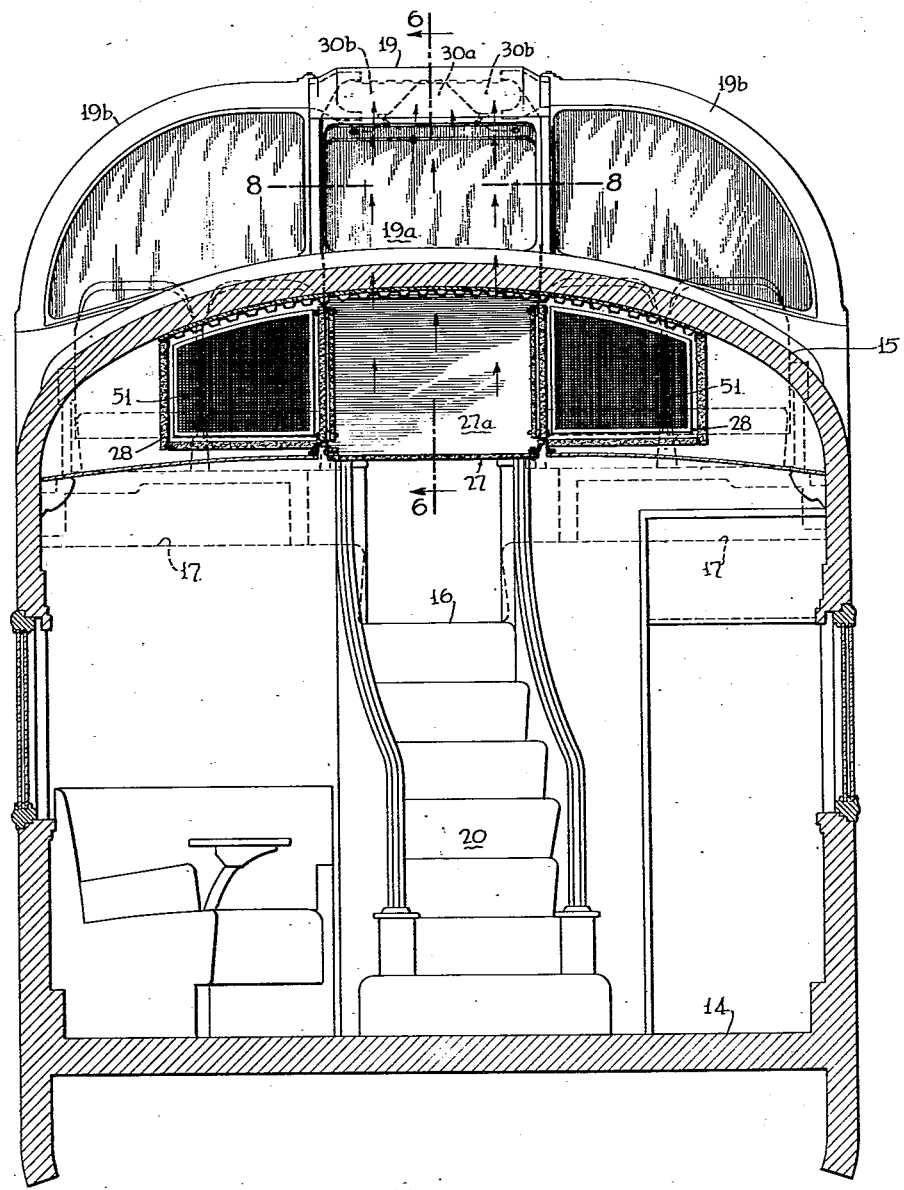
Fig. 5 is an enlarged transverse vertical section taken on the line 5—5 of Figs. 2 and 3.
Figure 7:
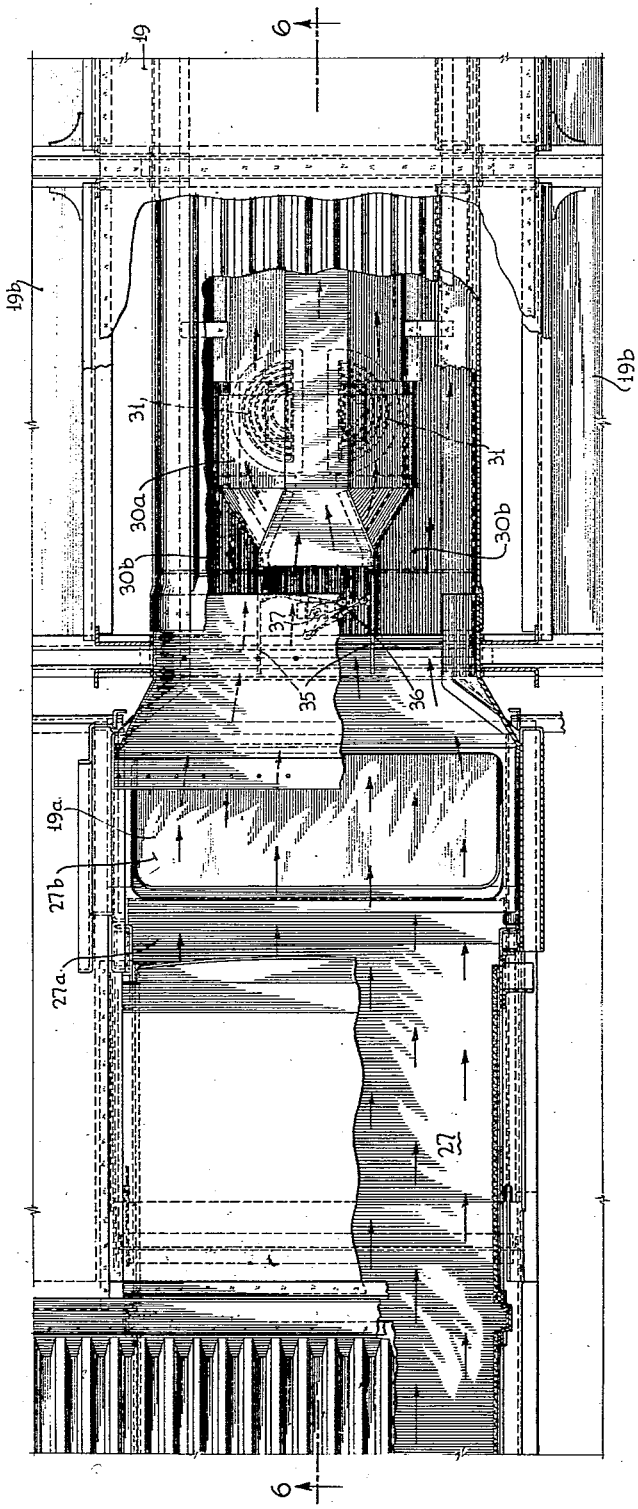
Fig. 7 is a plan view taken on the line 7—7 of Fig. 6.

The invention is here embodied in a domed railway car 10 having a lower portion 11, an intermediate dome portion or section 12, side walls 13, a lower floor 14, a lower roof 15, an upper floor 16 for an upper aisle, a raised upper floor 17 on each side of the upper aisle for seats 18, a dome roof 19, and stairs 20 leading from the lower level to the upper level.

The heating and ventilating equipment for the lower portion of the car may be of usual type; the present invention dealing with special means for heating and conditioning the dome portion of the car. A supplemental air heating and cooling or conditioning system 25 for the dome section is shown as being housed in a supplemental plenum chamber 26 arranged as near as conveniently possible to one end of the dome section. A supply duct 27 leads conditioned air from blower means in the plenum chamber 26 to the dome section. Return ducts 28 on one or both sides of the supply duct 27 convey part of the used air back to the plenum chamber 26. Fresh air from outside is supplied to the plenum chamber by one or more grilled and filtering intakes 29.

The supply duct 27 passes upwardly above the stair well of the stairs 20, as at 27a, then up between spaced end panes 19a of the dome enclosure 19 as at 27b, and then by a short section 27c connects with an overhead supply duct which is generally designated by the numeral 30.

The duct 30 is subdivided into a central sub-duct 30a and side sub-ducts 30b. At intervals the central sub-duct 30a is provided with air diffusing devices 31, such for example as those known commercially as "Anemostats," which direct air from above the aisle toward the seats, and the side sub-ducts are provided with slits 32 on the side for directing air along and across the under surface of the curved glass portions 19b of the dome roof 19.

In the cold season a smaller volume of heated air is required than the volume of cool air required in the hot season. Moreover, it is not desirable to force a draft of air past the glass dome and over the passengers' heads during the cold season since it would only throw away heat units and make the passengers uncomfortable. Accordingly, means are provided for opening the two side ducts in the hot season and closing them off partly or wholly in the cold season. The means herein shown for this purpose comprises dampers 35 hinged at their inner edges so as to be movable from a first extreme position across the ends of the side sub-ducts 30b to a second extreme position where they stand parallel to the dividing walls between the central sub-ducts and the side sub-ducts.

The dampers 35 are shown to be connected for conjoint movement, as by linkages 36, from a common operation shaft 37. The dampers may be operated by any suitable means and are here shown as arranged to be operated by hand, an attendant being furnished with a key for turning the dampers from heating to cooling operating positions when the conditioning apparatus in the plenum chamber is switched from heating to cooling operation. Inasmuch as this change may be made either by hand or by automatic temperature-responsive controls, it is evident that the same means may be used for shifting the dampers.

Means are provided for changing the volume of air supplied in the hot season in accordance with conditions of sunshine or shadow. For this purpose a sunlight temperature responsive device 40 is shown to be arranged on the lower roof of the car at the end near the main control lockers for changing the amount of conditioned air supplied to the dome section of the car from the supplemental conditioning equipment 25 in the plenum chamber 26. For example, when the sun is shining the volume may be twice as much as when it is cloudy. A greater volume of air increases the output velocity and more effectively sweeps the hot air away from the inner surface of the dome roof.

Means are provided for directly removing part of the used air from the dome section so that no draft of cold air down the stairs is felt. In fact, it is preferable to keep the pressure in the dome section at a value lower than that of the air pressure in the lower section of the car when chilled air which has a tendency to flow down the stair passage is supplied to the dome section. For this purpose, a supplemental air exhausting system is provided, the same including one or more motor-driven blowers 43 which take air from an intermediate chamber 44 and discharge it by way of one or more exhaust ducts 45 and an outlet 46 at one side of the car. A cover 47 at the end of the outlet 46 directs the exhaust air downward along the side of the car so it will not annoy those standing on a platform alongside the car.

Air from the dome section flows to the chamber 44 by way of outlet pipes which terminate beneath the seats, preferably being covered by mushroom-like domes 49 which provide space therebeneath for the inflow of air to the duct 48. Some of the outlet pipes lead directly into the chamber 44 and others lead to a duct 48 which runs to the chamber 44.

The main air return or exhaust ducts 28 terminate near the top of the stairs, as in intake grills 51 behind the seats on either side of the dome section aisle.

The control circuit shown in Fig. 12 comprises power lines L1 and L2 which are cut in by switch means, not shown, when the car system is shifted from heating to cooling. Thermometers T1 and T2 for the main part of the car or lower floor, respectively, energize relays R1 and R2 for valve solenoids VC1 and VC2 of valves V1, V2 which control the amount of cooling provided for the lower floor by evaporator units E1, E2. Basic cooling is provided, for example, when thermometer T1 makes contacts at, say 74° F., and full cooling is provided when thermometer T2 makes contact at, say 76° F. Switch S1 of relay R1 controls valve solenoids VC1 and switch S2 of relay R2 controls the valve solenoid VC2.

When either relay R1 or R2 is energized it closes a switch S3 or S4 respectively to energize a modulating control relay R5 and close its switch S5 which constitutes one control element for a line to energize a modulating relay R6 for the cooling system.

The dome section of the car has separate thermometers T3 and T4 which respectively energize relays R3 and R4 of solenoid coils VC3 and VC4 of valves V3 and V4 of dome evaporator units E3 and E4 respectively. The thermometers T3 and T4 may close contacts at, say 74° F. and 76° F., respectively. Switch S6 of relay R3 controls VC3 and switch S7 of relay R4 controls VC4.

Closure of switch S8 of R3 or S9 of R4 will energize cooling modulating control relay R7 to close another switch S10 of cooling modulating relay R6. A switch S11 of relay R3 and a switch S12 of relay R1, when either is closed, will energize a cooling pilot relay R8 to start the cooling system into operation whenever cooling is called for on either the lower or dome floor level.

A switch S13 of relay R4 and a switch S14 of relay R2, when either is closed, will complete the line to switches S4 and S10 to cooling modulating relay R6. This provides steady cooling by the main car cooling equipment until the high temperature thermometer of the main floor or dome is closed and modulation thereafter when either is closed.

It has been explained before that when the sun is hot it will act through a sunlight sensitive thermostat 40 to increase the flow of air to the dome. As shown in Fig. 12, the thermostat 40 closes its switch contacts to energize a relay R9 and close its switches S16 and S17.

Closure of switch S16 completes the line to relay R4, which provides that the additional dome cooling unit E4 will not operate unless the sun shines strongly enough to require it.

Closure of switch S17 will act upon the control circuit of the motor M1 of the blowers of the dome air conditioning system 25 to increase the flow of air. This action may, for example, double the volume of air supplied to the dome.

It will thus be seen that the invention provides air conditioning and ventilating means which will furnish the greatest possible comfort to passengers in a dome section and which will compensate automatically for sun conditions. Also that improved air exhaust means are provided which will eliminate undesirable drafts.

While one embodiment has been illustrated and described by way of example, it is to be understood that there may be various embodiments within the general scope of the invention.

What is claimed is:

1. In a vehicle having a lower section provided with air conditioning means and a dome section having passenger seats disposed so closely adjacent to thin exteriorly exposed portions of a dome roof that the heads of passengers are disposed in a zone of heated air located immediately beneath the thin portions and subject to discomfort when the sun is shining brightly, in combination, means for supplying cool conditioned air to the dome section, said air supply means including longitudinal air duct means adjacent the dome roof and on the inner side of said seats for distributing air continuously to the lower portions of the dome section, and other longitudinal air duct means adjacent the roof on the inner side of said seats and having narrow longitudinal slits along their length for forcing a thin sheet of air directly along and past the under-surface of the thin portions of the dome roof above the seats, the roof between the air duct means and the side of the car over the seats being free of air duct means and other obstructions to the flow of the sheet of air past the under surface of the roof, for the purposes set forth.

2. In a vehicle having a lower section provided with air conditioning means and a dome section having passenger seats disposed so closely adjacent to thin exteriorly exposed portions of a dome roof that the heads of passengers are disposed in a zone of heated air located immediately beneath the thin portions and subject to discomfort when the sun is shining brightly, in combination, means for supplying cool conditioned air to the dome section, said air supply means including air duct means adjacent the dome roof for distributing air continuously to the lower portions of the dome section, and other air duct means for forcing a thin sheet of air directly along and past the under-surface of the thin portions of the dome roof above the seats, the first said air duct means including a central sub-duct having outlet means for directing diffused air downward toward the seats, and said second air duct means including side sub-ducts having slots on the outer side for supplying sheets of air along the under surfaces of the roof, and means for selectively closing off said side sub-ducts when desired so as to distribute air only from said central sub-duct.

3. In a vehicle having a lower section provided with air conditioning means and a dome section having passenger seats disposed so closely adjacent to thin exteriorly exposed portions of a dome roof that the heads of passengers are disposed in a zone of heated air located immediately beneath the thin portions and subject to discomfort when the sun is shining brightly, in combination, means for supplying cool conditioned air to the dome section, said air supply means including longitudinal air duct means adjacent the dome roof and on the inner side of said seats for distributing air continuously to the lower portions of the dome section, other longitudinal air duct means adjacent the roof and on the inner side of said seats for forcing a thin sheet of air directly along and past the under-surface of the thin portions of the dome roof above the seats, the roof between the air duct means and the side of the car over the seats being free of air duct means and other obstructions to the flow of the sheet of air past the under surface of the roof, and means responsive to outside temperature and the effect of sunshine for controlling the amount of cool air forced into the dome section.

4. In a vehicle having a lower section provided with air conditioning means and a dome section having passenger seats disposed so closely adjacent to thin transparent exteriorly exposed portions of a dome roof that the heads of passengers are disposed in a zone of heated air located immediately beneath the thin portions and subject to discomfort when the sun is shining brightly, in combination, means for supplying cool conditioned air to the dome section, said air supply means including longitudinal air duct means adjacent the dome roof and on the inner side of said seats for distributing air continuously to the lower portions of the dome section, other longitudinal air duct means adjacent the roof on the inner side of said seats and having narrow longitudinal slits along their length for forcing a thin sheet of air directly along and past the under-surface of the thin portions of the dome roof above the seats, the roof between the air duct means and the side of the car over the seats being free of air duct means and other obstructions to the flow of the sheet of air past the under surface of the roof, and means for exhausting air from the dome section directly to the outside to maintain a pressure in the dome section lower than the pressure in the car as a whole to minimize drafts between the dome section and the lower section.

5. In a vehicle having a lower section provided with air conditioning means and a dome section having passenger seats disposed so closely adjacent to thin transparent exteriorly exposed portions of a dome roof that the heads of passengers are disposed in a zone of heated air located immediately beneath the thin portions and subject to discomfort when the sun is shining brightly, in combination, means for supplying cool conditioned air to the dome section, said air supply means including longitudinal air duct means adjacent the dome roof and on the inner side of said seats for distributing air continuously to the lower portions of the dome section, other longitudinal air duct means adjacent the roof on the inner side of said seats and having narrow longitudinal slits along their length for forcing a thin sheet of air directly along and past the under-surface of the thin portions of the dome roof above the seats, the roof between the air duct means and the side of the car over the seats being free of air duct means and other obstructions to the flow of the sheet of air past the under-surface of the roof, means for exhausting air from the dome section directly to the outside to maintain a pressure in the dome section lower than the pressure in the car as a whole to minimize drafts between the dome section and the lower section, said air exhausting means including intake openings disposed adjacent the floor of the dome section, and means for varying the total volume of air supplied to the dome section and correspondingly changing the velocity of air in the thin sheet along the under-surface of the roof in accordance with sunshine conditions on the roof, the amount of air supplied increasing with air temperature and the intensity of sunlight.

References Cited in the file of this patent

UNITED STATES PATENTS

| | | |
|---|---|---|
| 1,893,329 | Hynes | Jan. 3, 1933 |
| 2,055,988 | Stacey et al. | Sept. 29, 1936 |
| 2,073,744 | Henney | Mar. 16, 1937 |
| 2,080,960 | Dreyfuss | May 18, 1937 |
| 2,134,588 | Stacey | Oct. 25, 1938 |
| 2,143,827 | Demarest | Jan. 10, 1939 |
| 2,145,222 | Gunter | Jan. 24, 1939 |
| 2,220,587 | Strobell | Nov. 5, 1940 |
| 2,367,276 | Hanson | Jan. 16, 1945 |
| 2,383,423 | Steins | Aug. 21, 1945 |
| 2,405,136 | Dittrich | Aug. 6, 1946 |
| 2,553,262 | Lehane et al. | May 15, 1951 |
| 2,640,409 | Hans | June 2, 1953 |